(12) United States Patent
Hsiao et al.

(10) Patent No.: US 11,783,596 B2
(45) Date of Patent: *Oct. 10, 2023

(54) DETECTING TRAFFIC SIGNALING STATES WITH NEURAL NETWORKS

(71) Applicant: Waymo LLC, Mountain View, CA (US)

(72) Inventors: Edward Hsiao, Sunnyvale, CA (US); Yu Ouyang, San Jose, CA (US); Maoqing Yao, Newark, CA (US)

(73) Assignee: Waymo LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/738,339

(22) Filed: May 6, 2022

(65) Prior Publication Data
US 2022/0335731 A1 Oct. 20, 2022

Related U.S. Application Data

(63) Continuation of application No. 16/936,739, filed on Jul. 23, 2020, now Pat. No. 11,328,519.

(51) Int. Cl.
*G06K 9/00* (2022.01)
*G06V 20/58* (2022.01)
(Continued)

(52) U.S. Cl.
CPC ........... *G06V 20/584* (2022.01); *G06N 3/045* (2023.01); *G06N 3/049* (2013.01); *G06T 7/75* (2017.01);
(Continued)

(58) Field of Classification Search
CPC .... G06V 20/584; G06V 10/56; G06V 20/588; G06N 3/0454; G06N 3/049; G06T 7/75; G06T 2207/20084; G06T 2207/20132
(Continued)

(56) References Cited

U.S. PATENT DOCUMENTS 8,692,996 B2   4/2014   Davis
9,235,988 B2   1/2016   Mimeault et al.
(Continued)

FOREIGN PATENT DOCUMENTS

WO    WO 2020/001223    1/2020

OTHER PUBLICATIONS

De Charette et al., "Real time visual traffic lights recognition based on spot light detection and adaptive traffic lights templates," 2009 IEEE Intelligent Vehicles Symposium, Jun. 2009, 12 pages.
(Continued)

*Primary Examiner* — Jonathan S Lee
(74) *Attorney, Agent, or Firm* — Fish & Richardson P.C.

(57) ABSTRACT

Machine-learning models are described detecting the signaling state of a traffic signaling unit. A system can obtain an image of the traffic signaling unit, and select a model of the traffic signaling unit that identifies a position of each traffic lighting element on the unit. First and second neural network inputs are processed with a neural network to generate an estimated signaling state of the traffic signaling unit. The first neural network input can represent the image of the traffic signaling unit, and the second neural network input can represent the model of the traffic signaling unit. Using the estimated signaling state of the traffic signaling unit, the system can inform a driving decision of a vehicle.

20 Claims, 6 Drawing Sheets

(51) Int. Cl.
*G06T 7/73* (2017.01)
*G06V 10/56* (2022.01)
*G06V 20/56* (2022.01)
*G06N 3/049* (2023.01)
*G06N 3/045* (2023.01)

(52) U.S. Cl.
CPC ............ *G06V 10/56* (2022.01); *G06V 20/588* (2022.01); *G06T 2207/20084* (2013.01); *G06T 2207/20132* (2013.01)

(58) Field of Classification Search
USPC ........................................................ 382/104
See application file for complete search history.

(56) References Cited

U.S. PATENT DOCUMENTS

| | | |
|---|---|---|
| 9,690,297 B1 | 6/2017 | Ferguson et al. |
| 9,892,332 B1 | 2/2018 | Wendel et al. |
| 9,990,548 B2 | 6/2018 | Wellington et al. |
| 10,012,997 B2 | 7/2018 | Shalom et al. |
| 10,032,085 B2 | 7/2018 | Raghu et al. |
| 10,346,696 B1 | 7/2019 | Wendel et al. |
| 10,534,370 B2 | 1/2020 | Cavalcanti et al. |
| 10,614,325 B1 | 4/2020 | Ginsberg |
| 10,625,666 B2 | 4/2020 | Kato |
| 10,699,142 B2 | 6/2020 | Wisniowski et al. |
| 10,885,777 B2 | 1/2021 | Annapureddy et al. |
| 11,100,352 B2 | 8/2021 | Lee |
| 11,210,571 B2 | 12/2021 | Kwant |
| 2013/0211682 A1 | 8/2013 | Joshi et al. |
| 2014/0142809 A1 | 5/2014 | Schofield |
| 2020/0081450 A1 | 3/2020 | Clement et al. |
| 2022/0114375 A1* | 4/2022 | Chen .................... G06V 10/774 |
| 2022/0261583 A1* | 8/2022 | Chen .................... G06K 9/6269 |
| 2022/0277192 A1* | 9/2022 | Gou ......................... G06N 3/10 |

OTHER PUBLICATIONS

Fairfield et al., "Traffic light mapping and detection," 2011 IEEE International Conference on Robotics and Automation, May 2011, 6 pages.

Hirabayashi et al., "Traffic light recognition using high-definition map features," Robotics and Autonomous Systems, Jan. 2019, 111:62-72.

International Search Report and Written Opinion in International Appln. No. PCT/US2021/042954, dated Nov. 5, 2021, 16 pages.

Li et al., "Traffic Light Recognition for Complex Scene With Fusion Detections," IEEE Transactions on Intelligent Transportation Systems, Jan. 2018, 19(1):pp. 199-208.

Ma et al., "An Attention Bi-box Regression Network for Traffic Light Detection," International Conference on Intelligent Science and Big Data Engineering, Nov. 2019, pp. 399-410.

Possatti et al., "Traffic light recognition using deep learning and prior maps for autonomous cars," 2019 International Joint Conference on Neural Networks, Jul. 2019, 8 pages.

Rajapaksha et al., "Optimized Multi-Shaped Traffic Light Detection and Signal Recognition with Guided Framework," 2018 18th International Conference on Advances in ICT for Emerging Regions, Sep. 2018, pp. 86-88.

Zhang et al., "A multi-feature fusion based traffic light recognition algorithm for intelligent vehicles," Proceedings of the 33rd Chinese control conference, Jul. 2014, pp. 4924-4929.

International Preliminary Report on Patentability in International Appln. No. PCT/US2021/042954, dated Feb. 2, 2023, 9 pages.

* cited by examiner

DETECTING TRAFFIC SIGNALING STATES WITH NEURAL NETWORKS

CROSS REFERENCE TO RELATED APPLICATION

This application is a continuation of U.S. application Ser. No. 16/936,739, filed Jul. 23, 2020, the contents of which are incorporated by reference herein.

TECHNICAL FIELD

This document relates generally to neural networks, and more specifically to neural networks for detecting traffic signaling states for use in planning driving decisions on an autonomous vehicle.

BACKGROUND

Autonomous vehicles such as self-driving cars are equipped with an assortment of sensors and computer systems configured to observe and analyze the environment of the vehicle, and make control and navigation decisions in real-time.

Some autonomous vehicles implement neural networks to facilitate tasks related to driving and operation of the vehicle. Neural networks are machine-learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformations to be performed on input to the layer. Some neural network layers have operations that are referred to as neurons, which implement transformations according to weights established during a training process. Each neuron can receive one or more inputs and generate an output for another neural network layer. The transformations of each layer can be carried out by one or more computers at one or more locations having installed software modules that implement the transformations.

SUMMARY

Systems, methods, devices, and other techniques are disclosed for detecting the states of traffic signaling units (e.g., traffic lights) that control the flow of traffic on public or private roadways. Like other motorists, the control systems on autonomous vehicles direct attention to traffic signaling units to inform critical driving decisions such as whether traffic may proceed through an intersection, whether a turn-lane is open, whether a train is approaching at a railroad crossing, whether a vehicle may proceed at an on-ramp to a highway, or whether pedestrians are signaled to cross a street on a crosswalk. Due to the variety of configurations and types of traffic signaling units that may be encountered, and the state of each lighting element (e.g., on, off, or flashing), heuristically programming models on an autonomous vehicle to interpret the signaling state of a unit can be challenging. For example, the potential for flashing lights can introduce delay in the ability of heuristically coded models to predict the current signaling state of a traffic light because the model waits to see if a particular light is lit or unlit for an extended time interval, or is instead momentarily lit or unlit due to flashing. At the same time, context from other lighting elements and historical context may be available that could inform an earlier and more accurate determination of the signaling state of the traffic light. This specification describes machine-learning techniques that can be applied to improve the response time and accuracy of signaling state detections, while accounting for these additional contexts.

Some implementations of the subject matter disclosed herein include methods for detecting a signaling state of a traffic signaling unit. The methods can include actions performed by a system that include obtaining an image of the traffic signaling unit, and selecting a model of the traffic signaling unit that identifies a position of each traffic lighting element on the traffic signaling unit. First and second neural network inputs are processed with a neural network to generate an estimated signaling state of the traffic signaling unit. The first neural network input can represent the image of the traffic signaling unit, and the second neural network input can represent the model of the traffic signaling unit. Using the estimated signaling state of the traffic signaling unit, the system can inform a driving decision of a vehicle.

These and other implementations can further include one or more of the following features.

The estimated signaling state of the traffic signaling unit generated by the neural network can include data specifying, for each traffic lighting element on the traffic signaling unit, a respective lighting state of the traffic lighting element. The traffic signaling unit can include one or more traffic lighting elements.

The respective lighting state of each traffic lighting element can be selected from a group comprising an on state, an off state, and a flashing state.

The respective lighting state of each traffic lighting element can further indicate a color of the traffic lighting element.

The model can include an image depicting a respective representation of each traffic lighting element on a model traffic signaling unit of a type corresponding to the traffic signaling unit. The respective representation of each traffic lighting element can identify a shape and a relative position of the traffic lighting element on the model traffic signaling unit.

Selecting the model of the traffic signaling unit can include selecting the model from among a set of pre-defined models based on a determined type of the traffic signaling unit, wherein different ones of the plurality of pre-defined models correspond to different types of traffic signaling units.

The neural network can be or otherwise include a recurrent neural network. The recurrent neural network can be or otherwise include a long short-term memory (LSTM) neural network. In some implementations, the neural network can utilize gated recurrent units (GRUs).

The neural network can be further configured to process a third neural network input along with the first neural network input and the second neural network input to generate the estimated signaling state of the traffic signaling unit. The third neural network input can identify a type of the traffic signaling unit.

The hidden state of the neural network can be updated as a result of processing the first neural network input and the second neural network input to generate the estimated signaling state of the traffic signaling unit. The system can obtain a second image of the traffic signaling unit, and processing, with the neural network, and in accordance with the updated hidden state of the neural network, the second neural network input and a third neural network input to generate a second estimated signaling state of the traffic signaling unit, wherein the third neural network input represents the second image of the traffic signaling unit.

The system can obtain a sequence of images of the traffic signaling unit, each image in the sequence depicting the traffic signaling unit at a different time step of a series of time steps. The neural network can be configured: (a) to process (i) a first neural network input representing an initial image from the sequence of images that depicts the traffic signaling unit at an initial time step of the series of time steps and (ii) the model, to generate an estimated signaling state of the traffic signaling unit at the initial time step; and (b) for each particular time step in the series of time steps after the initial time step: to process (i) a first neural network input representing a respective image from the sequence of images that depicts the traffic signaling unit at the particular time step and (ii) the model, to generate an estimated signaling state of the traffic signaling unit at the particular time step that is based in part on at least one input representing an image from the sequence of images at a time step that precedes the particular time step.

Using the estimated signaling state of the traffic signaling unit to inform the driving decision of the vehicle can include processing the estimated signaling state of the traffic signaling unit to determine an estimated lane state of a lane in a vicinity of the vehicle; and generating the driving decision of the vehicle based on the estimated lane state.

Obtaining the image of the traffic signaling unit can include acquiring, with a camera mounted on the vehicle, an image of an environment of the vehicle that encompasses the traffic signaling unit. A portion of the image of the environment can be cropped to substantially isolate the traffic signaling unit in the image.

The vehicle can be a self-driving car that is operable to drive on roadways fully or semi-autonomously. In some examples, the vehicle is a simulated self-driving car.

Additional features and advantages will be apparent to persons of skill from the following descriptions, the claims, and figures.

DETAILED DESCRIPTION

This document describes systems, methods, devices, and other techniques for detecting a signaling state of a traffic signaling unit. Using a neural network that tracks dependencies over time (e.g., a recurrent neural network), a self-driving car may determine the state of a traffic signaling unit based on both a current observation of a traffic signaling unit and past observations of the unit. By training a neural network for this task, some implementations can achieve improved accuracy and reduced detection latency relative to other approaches that involve explicit counting of a number of consecutive observations in which lighting elements on the unit are lit or unlit.

Figure 1:
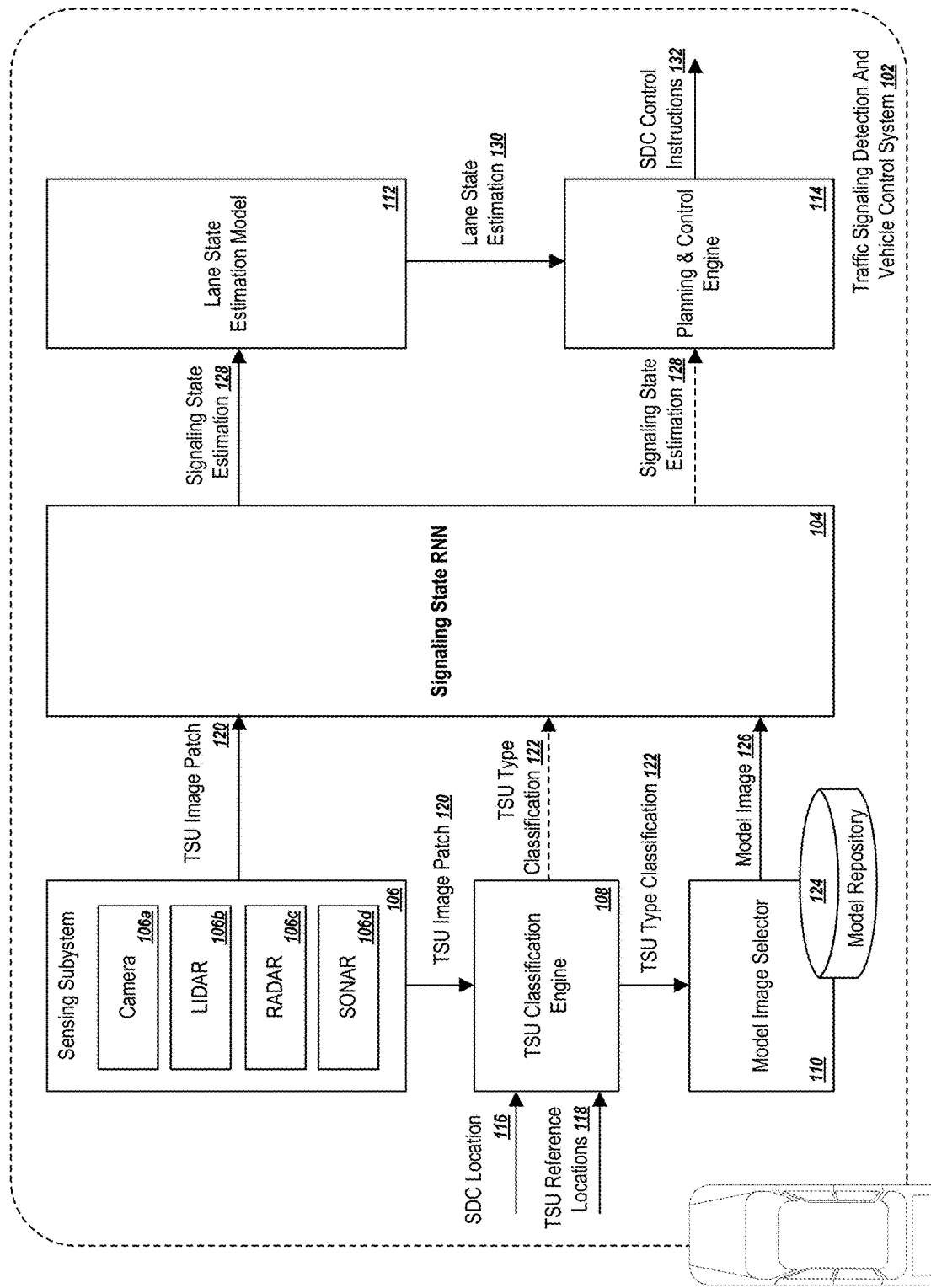
FIG. 1 is a block diagram of a system for detecting signaling states of traffic signaling units, and planning driving decisions based on the detected signaling states.
Figure 2A:
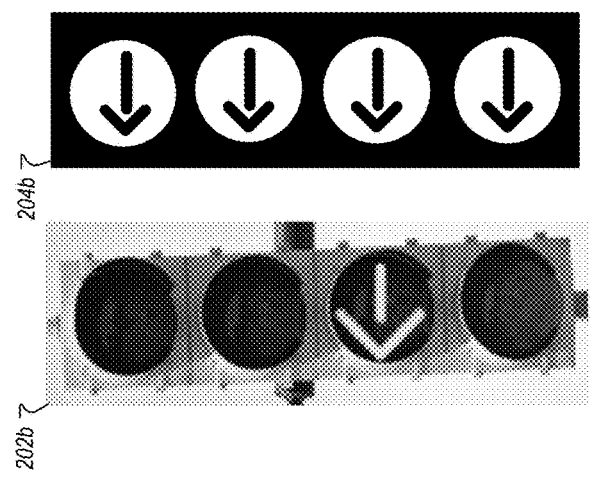
FIGS. 2A-2D depict example image patches showing different types of traffic signaling units, and corresponding virtual maps of traffic lighting elements on the signaling units.
Figure 2B:
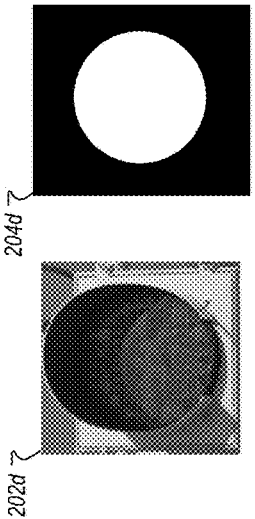
Figure 2C:
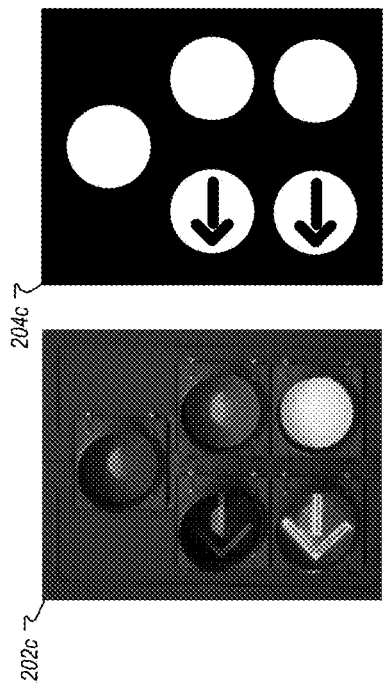
Figure 2D:

Referring to FIG. 1, a block diagram is shown of an example computing environment of a self-driving car 100 having a system 102 configured to detect states of traffic signaling units and inform driving decisions based on the detected states. The self-driving car (SDC) 100 can be an autonomous or semi-autonomous vehicle equipped with sensors and data processing apparatus which enable the SDC 100 to drive on roadways or perform specific driving tasks without user intervention. In certain examples, the SDC 100 can be a passenger vehicle such as a sedan, a pickup truck, a sport utility vehicle, a minivan, a crossover sport-utility-vehicle, or can be a commercial transport vehicle such as a lorry.

SDC 100 includes a sensing subsystem 106. The sensing subsystem 106 provides one or more sensors for acquiring observations about the environment in a vicinity of the SDC 100. For example, as the SDC 100 operates on public roadways, sensors in sensing subsystem 106 may constantly scan the environment to detect information necessary for systems on the SDC 100 to identify vehicles, pedestrians, obstacles, and traffic signals nearby the SDC 100. Sensors on-board the SDC 100 can include one or more cameras 106a, a light detection and ranging (LIDAR) system 106b, a radio detection and ranging (RADAR) system 106c, a sound navigation and ranging (SONAR) system 106d, or a combination of these and other sensors. LIDAR system 106b is configured to emit and detect reflections of laser light, while RADAR system 106c and SONAR system 106d are configured to emit and detect reflections of RF and sound wave energy, respectively, to determine the presence and distance of objects in the environment. The sensors 106a-d can each continually sweep portions of the environment in elevation, azimuth, or both. Sweeping in azimuth, for example, can allow a sensing subsystem to detect multiple objects in a line of sight. In some implementations, the sensing subsystem 106 generates a 2D projection of sensor data for a partial sweep, a single sweep, or multiple sweeps of one or more sensing subsystems of the vehicle. The 2D projection can be in the form of an image and can be based on observations acquired from any of the sensors 106a-d individually, or based on observations acquired from two or more of the sensors 106a-d.

For purposes of traffic signaling state detection, system 102 is concerned with identifying traffic signaling units in the environment of the SDC 100. A traffic signaling unit generally refers to a device having one or more lighting elements that employ lighting patterns to indicate traffic signals. Motorists and other users of a roadway look to traffic signaling units to determine whether to proceed or stop at an intersection, for example, based on whether green, yellow, or red lighting elements are lit for a prolonged period of time in an on-state, lit intermittently in a flashing state, or are unlit in an off state. For example, a common traffic signaling unit provides a set of three lights (i.e., red, yellow, and green) stacked vertically in a 3×1 arrangement. With this configuration, three common traffic signals can be communicated based on whether the red, yellow, or green light is lit in the "on" state. At times, however, even traffic signaling units can exhibit additional or different states. For instance, when an error or other unusual circumstance occurs, the red light may flash to signal that drivers should stop at the intersection and yield to other prior-arriving vehicles before proceeding. Moreover, many jurisdictions operate a wide range of other types of traffic signaling units. Some units are programmed to flash red, yellow, and/or green lights in normal operation. Some units include shaped lighting elements (in addition to or alternative to the common "round" element), such as left arrows, right arrows, up arrows, up-left arrows, up-right arrows, and others. Some units have different arrangements of lighting elements with different numbers of columns or rows, for example. Each lighting element in a traffic signaling unit can be said to have a respective state at a given time according to whether the lighting element is "on," "off," or "flashing." In some implementations, the state of a traffic lighting element is further differentiated by its color, e.g., red, yellow, green, or white. Noticeably, whether a lighting element is momentarily lit or unlit may not always, by itself, correctly indicate the true state of the lighting element since a flashing light will alternate between being lit and unlit. The collection of states for all or a subset of lighting elements on a traffic signaling unit defines an overall signaling state of the traffic signaling unit. For example, a difference in the on/off/flashing state of a single lighting element in a signaling unit may sufficiently distinguish two overall traffic signaling states of the signaling unit.

In some implementations, sensing subsystem 106 performs pre-processing of environmental images that indicate results of observations acquired by sensors 106a, 106b, 106c, and/or 106d. The pre-processing can include extraction of a portion of the image that focuses on a detected traffic signaling unit. For example, the pre-processor may invoke a suitable object detection or recognition algorithm to analyze the larger environmental image. The larger image can be cropped to substantially isolate the traffic signaling unit. The resulting image of the traffic signaling unit is referred to herein as a TSU image patch. For instance, FIG. 1 shows the sensing subsystem 106 outputting a TSU image patch 120. Image patch 120 is an image containing one or more channels of sensor data related to an observation of a detected traffic signaling unit in the environment of the SDC 100.

System 102 further includes a TSU classification engine 108. The classification engine 108 is operable to identify a type of traffic signaling unit shown in image patch 120. The "type" of a traffic signaling unit generally refers to the configuration and arrangement of traffic lighting elements on the unit. By way of example, FIGS. 2A-2D show image patches 202a-d of four different types of traffic signaling units. A first type of traffic signaling unit shown in patch 202a includes three round lighting elements arranged vertically in a 3×1 pattern. A second type of traffic signaling unit shown in patch 202b includes four round lighting elements arranged vertically in a 4×1 pattern, each with a left arrow shape. A third type of traffic signaling unit shown in patch 202c includes five lighting elements, with two left turn arrows and three round elements. Finally, a fourth type of traffic signaling unit shown in patch 202d includes a single round lighting element. Classification engine 108 can analyze the TSU image patch 120 and, optionally, process inputs 116 and 118, to generate a TSU type classification 122 that indicates a predicted type of the traffic signaling unit shown in patch 120. In some implementations, object recognition or other suitable image processing algorithms can be employed to estimate the type of the traffic signaling unit. In some implementations, a machine-learning model such as a convolutional or feedforward neural network can be employed to classify the type of the traffic signaling unit. While the classification engine 108 can generate a classification based on the image patch 120 alone, in other cases the engine 108 can further use information about a location 116 of the SDC 100 and/or traffic signaling unit to aid in the classification. For example, TSU location data 118 may list, for each traffic signaling unit in a geographic region, a classification type of the unit and a location of the unit. The current location 116 can be compared to the locations in data 118, and the type of traffic signaling unit looked up for the nearest matching location.

The system 102 can further maintain a database or other repository 124 of model traffic signaling unit images. A model image generally refers to an image that shows a representation of each traffic lighting element provided on a particular type of signaling unit, the position of each traffic lighting element, and optionally, the shape of each traffic lighting element. The model image is typically not an actual photograph or other observation of a traffic signaling unit acquired by sensors in subsystem 106. Instead, the model image may define in a virtual model of the traffic signaling unit expected regions of interest that correspond to individual lighting elements in the unit. For example, model images 204a-d are respectively depicted in FIGS. 2A-2D of corresponding traffic signaling units shown in patches 202a-d. The model image can include a background (e.g., represented in black) where no lighting element is present. Model lighting elements are represented by different colors, or different pixel values, than the background mask. In some implementations, a different color or pixel value can be assigned to each unique shape of traffic lighting elements. For instance, in model 204c, a different value can code the pixels in the regions corresponding to the left-most lighting elements (which are shaped as left arrows) from the value that codes pixels in the regions corresponding to the solid round (non-arrow) lighting elements. Other encoding schemes are also possible that identify the position, and optionally the shape, of each traffic lighting element in a signaling unit.

To aid in the detection of a signaling state of a traffic signaling unit, a model selection engine 110 can be provided in system 102. The model selection engine 110 receives an indication of the TSU type classification 122 from classification engine 108, and based on the determined type of the traffic signaling unit shown in image patch 120, selects a corresponding model image 126. In some implementations, repository 124 stored various pre-defined model images that each correspond to a different type of traffic signaling unit. The images can be keyed to the type of traffic signaling unit they represent, and the model selection engine 110 selects a model image 126 that is linked to the TSU type identified by classification 122.

A neural network 104 (referred to herein as a "signaling state" neural network) is provided in system 102 to generate state estimations. It is preferred that neural network 104 be capable of leveraging temporal dependencies from observations of a traffic signaling unit, and as such, network 104 is shown as a recurrent neural network (RNN). As an RNN, the neural network 104 can process a sequence of images of a same traffic signaling unit captured over a series of time steps to generate a corresponding series of state estimations. In some implementations, signaling state neural network 104 includes a long short-term memory (LSTM) neural network. In some implementations, signaling state neural network 104 includes gated recurrent units (GRUs). Other types of neural networks that account for temporal dependencies among inputs in a sequence may also be employed (e.g., transformer neural networks).

The signaling state RNN 104 processes certain neural network inputs to generate an output 128 that describes an estimated state of the traffic signaling unit depicted in image patch 120. In some implementations, the signaling state RNN 104 is configured to generate a value indicative of the overall traffic signaling state of the unit. The overall signaling state accounts for the individual states of all or a subset of the traffic lighting elements on the unit. In other implementations, the signaling state RNN is configured to generate an output 128 that directly specifies, for each traffic lighting element on the unit, an estimated current state of the lighting element. In some cases, the estimated lighting element states 128 include "on," "off," and "flashing." In some cases, the estimating lighting element states 128 further distinguish colors of the lighting elements, e.g., "red off," "red on, "red flashing," "green off," "green on," "green flashing," "yellow off," "yellow on," and "yellow flashing." For example, a first overall traffic signaling state of the unit shown in patch 202a can correspond to the collection of traffic lighting element states "red off," "yellow off," "green on"; a second overall traffic signaling state of the unit shown in patch 202 can correspond to the collection of traffic lighting element states "red off," "yellow on," "green off"; and a third overall traffic signaling state of the unit shown in patch 202 can correspond to the collection of traffic lighting element states "red on," "yellow off," "green off."

RNN 104 processes a first neural network input representative of image patch 120 and a second neural network input representative of model image 126 to generate state estimation(s) 128. The neural network inputs can each be vectors or arrays of floating point values that indicate the RGB or coded values of the pixels in image patch 120 and model image 126, respectively. The inputs representing images 120, 126 can have fixed or variable size. In some implementations, the system 102 constrains image patch 120 and model image 126 to have the same size (e.g., resolution or dimensions). In some implementations, signaling state RNN 104 further receives an input 122 from classification engine 108. The input 122 provides the neural network with an explicit indication of the determined type of the traffic signaling unit shown in image patch 120, and RNN 104 can process this input along with the first and second inputs when generating state estimation(s) 128.

The output of signaling state RNN 104 is conditioned not just on the inputs to the network at a current time step, but also on inputs from the preceding steps in a sequence of time steps. As noted above, sensing subsystem 106 continuously sweeps the environment to generate updated images, and this can occur at a relatively fast rate (e.g., every 10 ms, 50 ms, 100 ms, 200 ms, 500 ms). With each scan or sweep, a new image patch 120 can be generated that focuses on the target traffic signaling unit at the most recent (e.g., current) time step. The progression of image patches 120 emitted in this manner provides a sequence of image patches that can be processed (along with other inputs) sequentially by the signaling state RNN 104 to generate an updated state estimation 128 at each time step. The same model image 126, and optionally type classification 122, can be processed at each time step, even as a new image patch 120 is provided at each time step. The conditioning that results from processing inputs at preceding time steps is reflected by the internal hidden state of the RNN 104. When a new sequence is to be processed, the internal hidden state can be reset to a default state. The hidden state is then updated as a result of processing the first set of inputs at the initial time step to generate a first state estimation 128 for the initial time step. Thereafter, the hidden state is updated again at each subsequent time step as a result of processing the respective set of inputs at that time step to generate a state estimation at that time step. By conditioning the outputs on both current and past inputs, the signaling state RNN 104 can account for temporal context and better differentiate between a momentarily lit lighting element in the "flashing" state from the prolonged "on" state, or a momentarily unlit element in the "flashing" state from the prolonged "off" state. Transitions between states may also be detected more quickly.

State estimation(s) 128 generated by the signaling state RNN 104 can be fed to one or more other services on SDC 100, and these services can aid in the rendering and implementation of driving decisions for SDC 100. For example, as shown in FIG. 1, state estimation(s) 128 can be provided to a lane state estimation model 112. The lane state estimation model 112 generates a lane state estimation 130 based on the state estimation(s) 128, where a lane state estimation indicates the predicted state(s) of one or more lanes in the vicinity of the SDC 100. For instance, the lane state estimation model 112 may predict whether the current lane on which the SDC 100 travels, or adjacent lanes, are open or closed within an intersection that SDC 100 plans to travel through. Lanes may be identified with reference to road-graph data 134, which indicates the boundaries and/or midlines of lanes of a roadway. The lane state estimation 130 may be inferred or mapped based on state estimation(s) 128. For example, a state estimation 128 that indicates a solid round lighting element is in the green on state, while a left arrow lighting element is in the yellow on state, may indicate that the lane running straight through an intersection is open but the left-turn lane through the intersection is about to close. Accordingly, the vehicle 100 may determine to proceed straight through the intersection, or may stop at the intersection if intending to turn left. In some implementations, driving decisions are made by a planning and control engine 114. The planning and control engine 114 receives a range of inputs including lane state estimation 130, and generates SDC control instructions 132 that describe driving decisions, driving maneuvers, or instructions for implementing driving maneuvers, that allow the SDC 100 to safely operate on a roadway while navigating to a destination.

Figure 3:
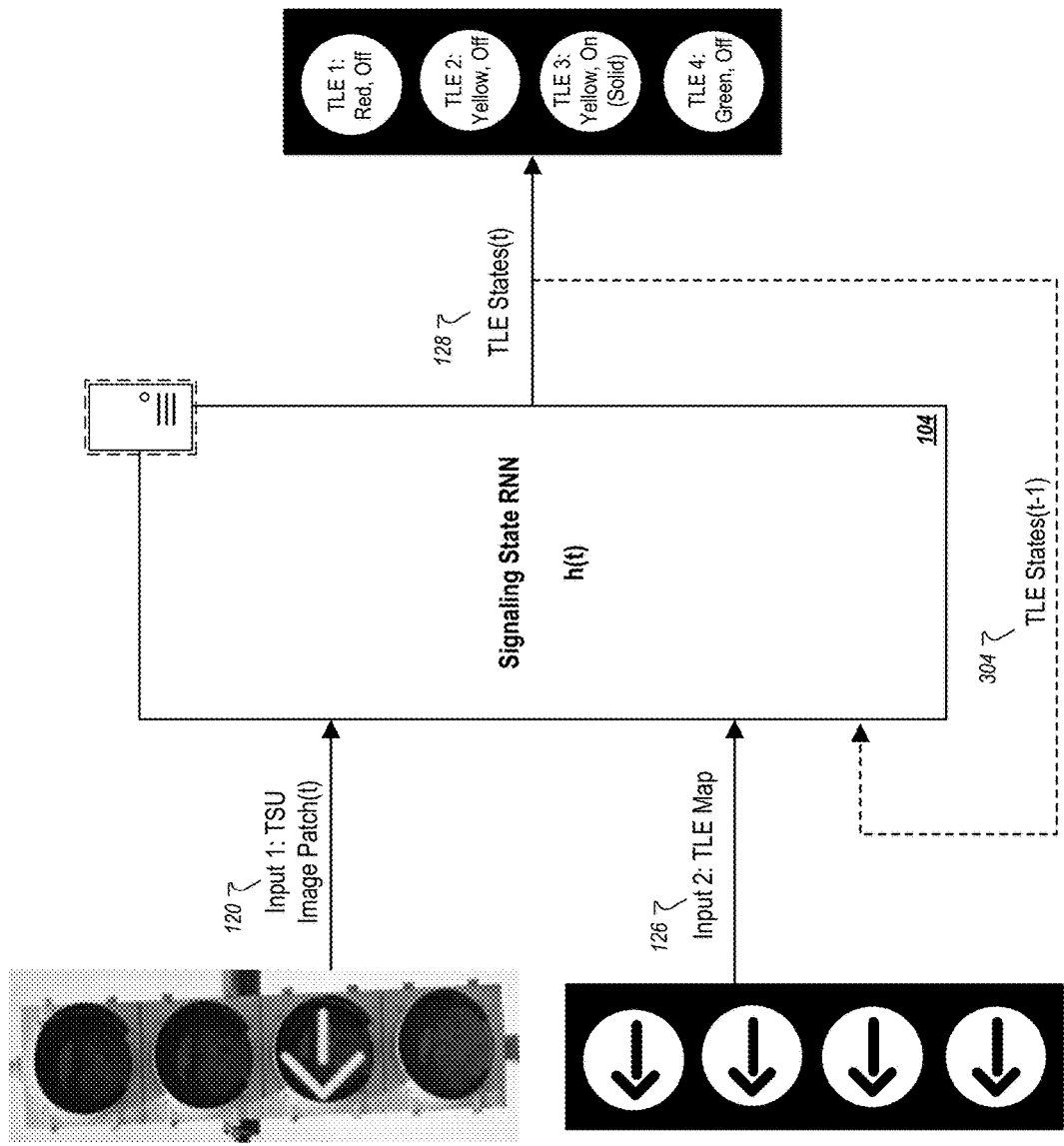
FIG. 3 is a pictorial representation of a signaling state recurrent neural network generating an estimated signaling state based on neural network inputs representing an image patch and model image.

FIG. 3 illustrates processing performed by a signaling state RNN 104 to generate a signaling state estimation, e.g., traffic lighting element (TLE) state estimation 128. Signaling state RNN 104 processes a first neural network input 320 characterizing an image patch 202b of a 4×1 traffic signaling unit and a second neural network input 326 characterizing a corresponding model image 204b. Inputs 320, 326 are processed at a current time step t to generate a current state estimation 128 for time step t. Different first neural network inputs 320 characterizing observations of the traffic signaling unit at different time steps can be processed to estimate the state of the traffic signaling unit at other time steps. In some implementations, the signaling state RNN 104 processes a third neural network input 304 to generate a state estimation 128 at time step t, where the third neural network input 304 represents the state estimation from a preceding time step t−1. Signaling state RNN 104 maintains an internal hidden state h(t) that is updated at each time step as a result of processing a set of inputs to generate a state estimation for that time step. The output of RNN 104 is thus conditioned at each time step both on the current inputs for that time step and the inputs at preceding time steps.

Figure 4:
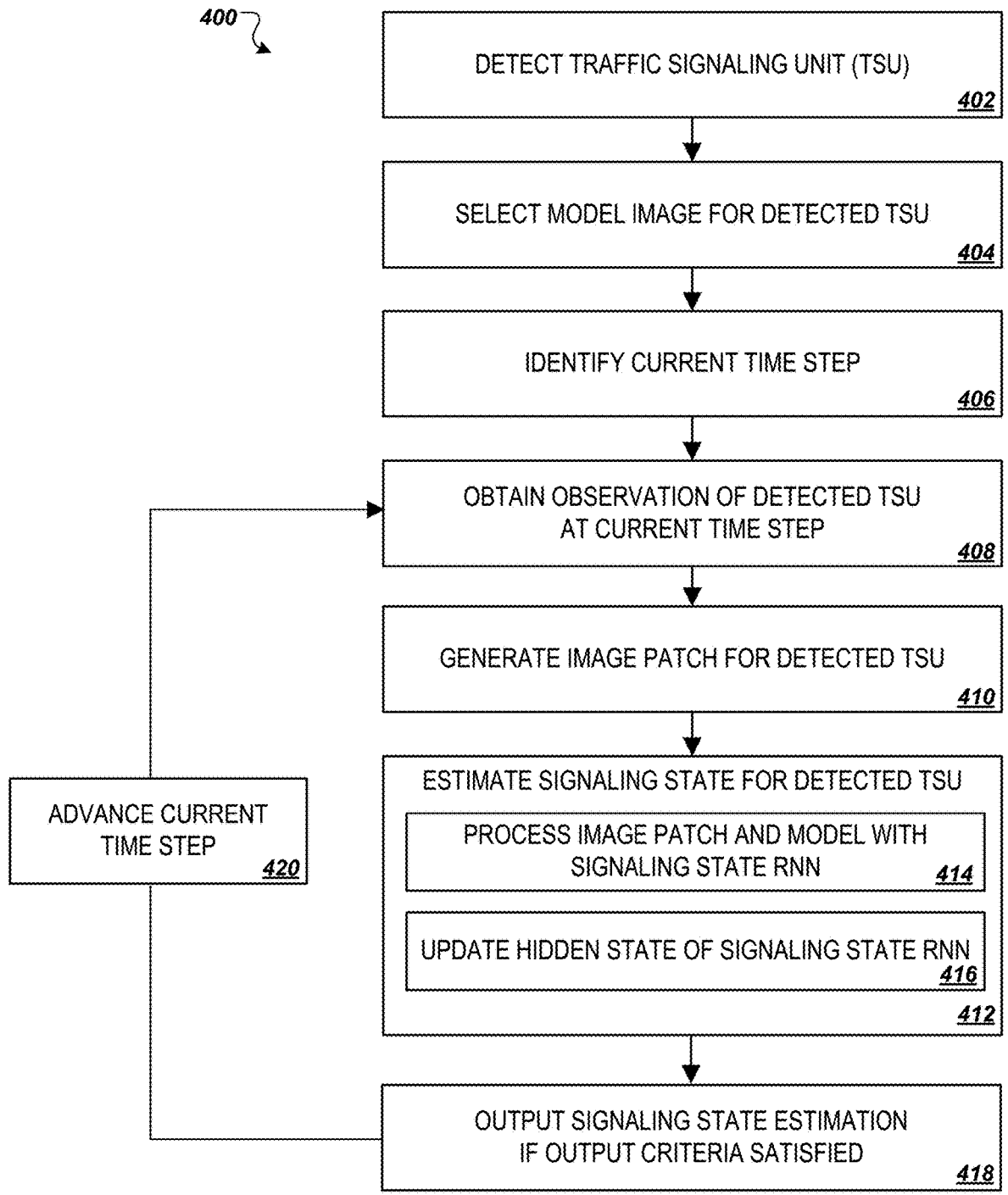
FIG. 4 is a flowchart of an example process for determining estimated signal states of a detected traffic signaling unit.

FIG. 4 depicts a flowchart of an example process 400 for estimating the signaling state of a traffic signaling unit over a series of time steps using a recurrent neural network. In some implementations, the process 400 can be carried out by a system of one or more computers in one or more locations. The process 400 can also be performed by systems on-board an autonomous or semi-autonomous vehicle, e.g., self-driving car 100.

As the self-driving car operates on a roadway, it uses its on-board environmental sensors to capture information about the environment and generate images based on observations from camera, LIDAR, RADAR, and/or SONAR devices. An imaging subsystem analyzes the resulting images and sensor data to detect a traffic signaling unit in the vicinity of the self-driving car (402). The system can determine a type or classification for the detected traffic signaling unit, and can select a model image that corresponds to the determined type of the traffic signaling unit (404). In some implementations, the type of the traffic signaling unit is determined by a classification engine, e.g., TSU classification engine 108. Model image selection can be performed by a model image selection engine, e.g., selection engine 110. The system identifies a current time step (406), and then obtains an observation of the detected traffic signaling unit for the current time step (408). The observation can initially be within a larger environmental image, but the system can generate a smaller patch that focuses specifically on the detected traffic signaling unit (410). The image patch and model image are provided as inputs to the signaling state RNN, which processes the inputs (414) in accordance with a current hidden state to generate an estimate of the signaling state of the traffic signaling unit at the current time step (412). By processing these inputs and generating an output at the current time step, the RNN can also update its current hidden state (416). The system can output the estimated signaling state (e.g., provide the estimated signaling state to a lane state estimation model, planning and control engine, or other resource) whenever applicable output criteria are satisfied (418). In some implementations, no output criteria are used to screen when outputs are provided to other resources. In other implementations, the output criteria may require a minimum number of estimations to be generated for the detected traffic signaling unit over a series of time steps before an estimation is provided to a planner or other external resource. If an additional observation of the traffic signaling unit is available, the system advances the current time step (420) and repeats processing for the next observation at 408. When a new traffic signaling unit is detected, the internal hidden state of the RNN can be reset and the process 400 begun anew.

Figure 5:
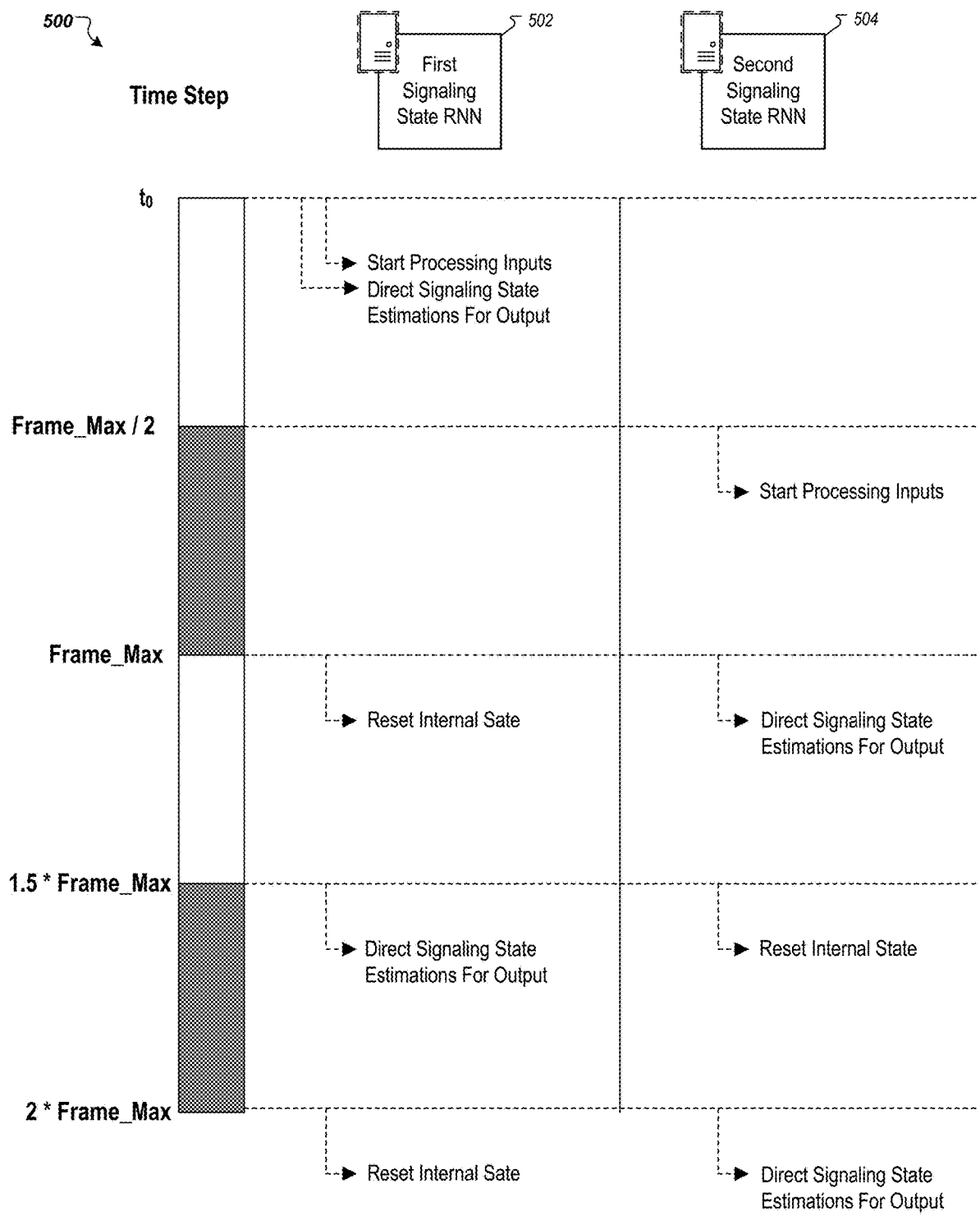
FIG. 5 illustrates an example of alternating use of outputs from a pair of signaling state recurrent neural networks on a vehicle.

In practice, some implementations of RNN 104 can become unstable if the number of predictions made in sequence for a particular traffic signaling unit substantially exceeds the number of consecutive inputs that were provided during training of the RNN. FIG. 5 depicts a configuration 500 that provides a solution for this problem, which allows signaling state estimations to be made and obtained on a continuous basis without risking instability as a result of excessively long input sequences. The configuration 500 employs multiple signaling state RNNs running in parallel, e.g., first signaling state RNN 502 and second signaling state RNN 504. Although two RNNS are depicted here, 3, 4, or more RNNs can alternatively be employed in the configuration 500 in some implementations. A maximum sequence length "Frame_Max" can be set by a system administrator, which is a value that specifies the maximum number of time steps in which either RNN 502 or 504 should perform processing to generate a signaling state estimation before its hidden state is reset so that subsequent outputs are no longer conditioned on prior inputs. The value of Frame_Max is implementation dependent, but may be 10, 25, 50, or 100 in some examples. At an initial time step to, the first signaling state RNN 502 begins processing inputs, and the signaling state estimations generated by RNN 502 are directed for output (e.g., provided to a planner or lane state estimator on an SDC). With each time step, a new input is processed and the hidden state of RNN 502 is updated. After Frame_Max/2 time steps, the second signaling state RNN 504 begins processing inputs, although the estimations generated by RNN 504 are not immediately directed for output. With each time step, a new input is processed and the hidden state of RNN 504 is updated. The first and second RNNs 502, 504 process the same inputs at each time step after Frame_Max/2, but is conditioned on a different number of prior inputs. From this point on, the estimations from RNNs 502, 504 are alternately directed for output every Frame_Max/2 time steps, while the other RNNs hidden state is reset. In this manner, the estimations directed for output are almost always conditioned on at least Frame_Max/2 prior inputs, and yet neither RNN 502 or 504 is conditioned on an excessive number of inputs that could risk instability.

Figure 6:
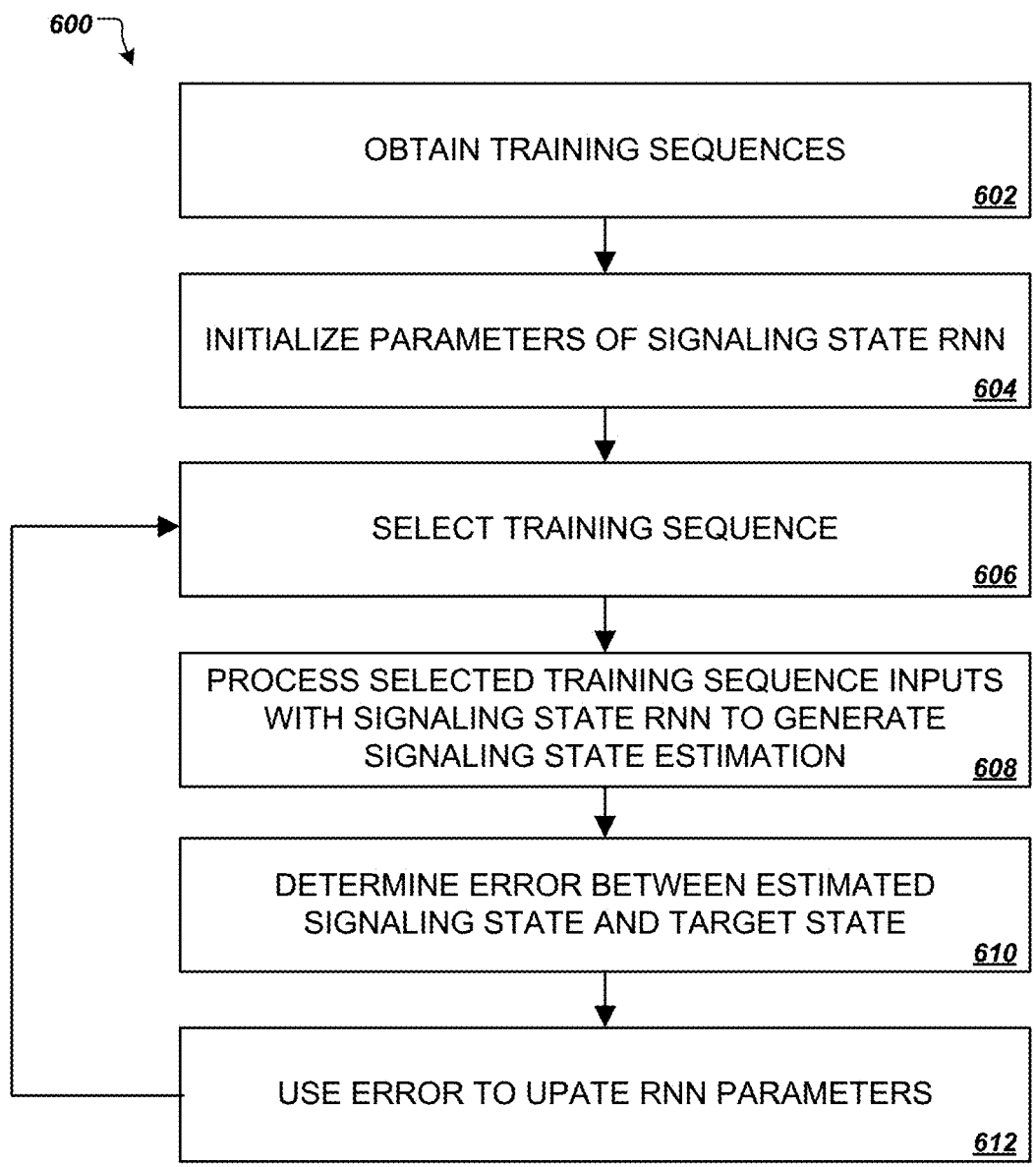
FIG. 6 is a flowchart of an example process for training a signaling state recurrent neural network.

Referring to FIG. 6, a flowchart is shown of an example process 600 for training a signaling state RNN, e.g., RNNs 104, 502, or 504. The process 600 can be performed by a system of one or more computers in one or more locations. Training can be performed on computers located off of the self-driving car, and the parameters of the trained network can then be loaded onto car's systems for use. The system can obtain a collection of training sequences (602). Each training sequence can include training inputs and a target output. The training inputs in each sequence include a series of image patches of a traffic signaling unit over a plurality of time steps, and a model image corresponding to the type of traffic signaling unit depicted in the image patches. Typically, the same model image is processed at each time step of a training sequence, but in other implementations variations can be applied to the model image, e.g., to match the perspective or angle of patch image. The target output is the true output that is desired to be generated by the RNN as a result of processing each input in the training sequence. For example, the target output can specify, for each lighting element in the depicted traffic signaling unit, the true state (e.g., on/off/flashing and color) of the lighting element, or may specify a value representative of the overall target traffic signaling estimation. In some training sequences, the target output can remain unchanged for each input at each time step. In other training sequences, the state of the traffic signaling unit (or individual lighting elements) may change, and the target output reflects different targets at different time steps. In this way, the RNN can learn state transitions. To aid the training process, initially the RNN may be trained on fewer training sequences that involve flashing states. As the RNN becomes trained to distinguish on from off states, gradually the frequency of training sequences that involve flashing lighting elements may be increased to allow the RNN to further distinguish between on, off, and flashing states. With training sequences available, a suitable supervised machine-learning technique for training recurrent neural networks, such as backpropagation through time, can be applied to train the signaling state RNN. The weights or parameters of the RNN are initialized (604). The system selects a training sequence (606), and processes the inputs from the selected training sequence with the signaling state RNN in accordance with its current weights/parameters (608). An error is determined between the output of the RNN and target output (610), and the error can be backpropagated through time so that the RNN weights/parameters are updated to reduce the error (612). Additional training sequences can be selected and processed in iterative fashion until criteria for ending training are met.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method for detecting a signaling state of a traffic signaling unit, comprising:
    obtaining an image of the traffic signaling unit;
    selecting a model of the traffic signaling unit that identifies a position of each traffic lighting element on the traffic signaling unit;
    processing, with a machine-learning model, a first input and a second input to generate an estimated signaling state of the traffic signaling unit, wherein the first input represents the image of the traffic signaling unit, and the second input represents the model of the traffic signaling unit; and
    using the estimated signaling state of the traffic signaling unit as an input to a process for generating a driving decision of a vehicle, wherein a movement of the vehicle is determined based at least in part on the driving decision.

2. The method of claim 1, wherein the machine-learning model comprises a neural network trained by processing a collection of training samples, each training sample comprising a training input and a target output, each training input including (i) data representing a respective sequence of images of the traffic signaling unit over time and (ii) data representing a particular model of the traffic signaling unit shown in the respective sequence of images of the training input, each target output representing a labeled signaling state of the traffic signaling unit shown in the respective sequence of images of the training input for the training sample.

3. The method of claim 1, wherein the estimated signaling state of the traffic signaling unit generated by the machine-learning model includes data specifying, for each traffic lighting element on the traffic signaling unit, a respective lighting state of the traffic lighting element.

4. The method of claim 1, wherein the respective lighting state of each traffic lighting element is selected from a group comprising an on state, an off state, and a flashing state.

5. The method of claim 4, wherein the respective lighting state of each traffic lighting element further indicates a color of the traffic lighting element.

6. The method of claim 1, wherein the model comprises an image depicting a respective representation of each traffic lighting element on a model traffic signaling unit of a type corresponding to the traffic signaling unit, wherein the respective representation of each traffic lighting element identifies a shape and a relative position of the traffic lighting element on the model traffic signaling unit.

7. The method of claim 1, wherein selecting the model of the traffic signaling unit comprises selecting the model from among a plurality of pre-defined models based on a determined type of the traffic signaling unit, wherein different ones of the plurality of pre-defined models correspond to different types of traffic signaling units.

8. The method of claim 1, wherein the machine-learning model is structured to permit temporal dependencies among a series of inputs.

9. The method of claim 8, wherein the machine-learning model comprises a recurrent neural network, a long short-term memory (LSTM) neural network, or a transformer.

10. The method of claim 1, wherein the machine-learning model is further configured to process a third input along with the first input and the second input to generate the estimated signaling state of the traffic signaling unit, wherein the third input identifies a type of the traffic signaling unit.

11. The method of claim 1, further comprising:
    updating a hidden state of the machine-learning model as a result of processing the first input and the second input to generate the estimated signaling state of the traffic signaling unit;
    obtaining a second image of the traffic signaling unit; and
    processing, with the machine-learning model, and in accordance with the updated hidden state of the machine-learning model, the second input and a third input to generate a second estimated signaling state of the traffic signaling unit, wherein the third input represents the second image of the traffic signaling unit.

12. The method of claim 1, further comprising obtaining a sequence of images of the traffic signaling unit, each image in the sequence depicting the traffic signaling unit at a different time step of a series of time steps;
    wherein the machine-learning model is configured:
        to process (i) a first input representing an initial image from the sequence of images that depicts the traffic signaling unit at an initial time step of the series of time steps and (ii) the model, to generate an estimated signaling state of the traffic signaling unit at the initial time step; and
        for each particular time step in the series of time steps after the initial time step:
            to process (i) a first input representing a respective image from the sequence of images that depicts the traffic signaling unit at the particular time step and (ii) the model, to generate an estimated signaling state of the traffic signaling unit at the particular time step that is based in part on at least one input representing an image from the sequence of images at a time step that precedes the particular time step.

13. The method of claim 1, comprising:
processing the estimated signaling state of the traffic signaling unit to determine an estimated lane state of a lane in a vicinity of the vehicle; and
generating the driving decision of the vehicle based on the estimated lane state.

14. The method of claim 1, wherein obtaining the image of the traffic signaling unit comprises:
acquiring, with a camera mounted on the vehicle, an image of an environment of the vehicle that encompasses the traffic signaling unit; and
cropping a portion of the image of the environment to substantially isolate the traffic signaling unit in the image.

15. The method of claim 1, wherein the vehicle comprises a self-driving car that is operable to drive on roadways fully or semi-autonomously.

16. The method of claim 1, wherein the vehicle comprises a simulated self-driving car.

17. The method of claim 1, wherein the estimated signaling state of the traffic signaling unit generated by the machine-learning model includes data specifying, for each traffic lighting element on the traffic signaling unit, a respective lighting state of the traffic lighting element, wherein the respective lighting state of each traffic lighting element is selected from a group comprising an on state, an off state, and a flashing state.

18. A system, comprising:
one or more processors; and
one or more non-transitory computer-readable media having instructions stored thereon that, when executed by the one or more processors, cause performance of operations comprising:
obtaining an image of the traffic signaling unit;
selecting a model of the traffic signaling unit that identifies a position of each traffic lighting element on the traffic signaling unit;
processing, with a machine-learning model, a first input and a second input to generate an estimated signaling state of the traffic signaling unit, wherein the first input represents the image of the traffic signaling unit, and the second input represents the model of the traffic signaling unit; and
using the estimated signaling state of the traffic signaling unit as an input to a process for generating a driving decision of a vehicle, wherein a movement of the vehicle is determined based at least in part on the driving decision.

19. The system of claim 18, wherein the machine-learning model comprises a neural network trained by processing a collection of training samples, each training sample comprising a training input and a target output, each training input including (i) data representing a respective sequence of images of the traffic signaling unit over time and (ii) data representing a particular model of the traffic signaling unit shown in the respective sequence of images of the training input, each target output representing a labeled signaling state of the traffic signaling unit shown in the respective sequence of images of the training input for the training sample.

20. A method for training a traffic unit signaling state estimation neural network, comprising:
obtaining a set of training samples, each training sample comprising a training input and a target output, each training input including (i) data representing a respective sequence of images of a traffic signaling unit over time and (ii) data representing a particular model of the traffic signaling unit shown in the respective sequence of images of the training input, each target output representing a labeled signaling state of the traffic signaling unit shown in the respective sequence of images of the training input for the training sample;
processing the training inputs in the training samples with the traffic unit signaling state estimation neural network to generate respective signaling state estimations from the training inputs;
determining errors between the respective signaling state estimations and the target outputs of the training samples;
updating parameters of the traffic unit signaling state estimation neural network based on the errors; and
using a trained version of the traffic unit signaling state estimation neural network in a control system that generates driving decisions for an autonomous vehicle.

* * * * *